(12) United States Patent
Kim

(10) Patent No.: US 10,479,307 B2
(45) Date of Patent: Nov. 19, 2019

(54) APPARATUS FOR CONTROLLING CRASH PAD LINKED WITH VEHICLE SEAT AND METHOD FOR CONTROLLING CRASH PAD FOR VEHICLE

(71) Applicants: Hyundai Motor Company, Seoul (KR); Kia Motors Corporation, Seoul (KR)

(72) Inventor: Hye Kyung Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 62 days.

(21) Appl. No.: 15/648,653

(22) Filed: Jul. 13, 2017

(65) Prior Publication Data

US 2018/0162309 A1 Jun. 14, 2018

(30) Foreign Application Priority Data

Dec. 13, 2016 (KR) .................... 10-2016-0169319

(51) Int. Cl.
*B60R 21/02* (2006.01)
*B60N 2/90* (2018.01)
(Continued)

(52) U.S. Cl.
CPC ........ *B60R 21/0286* (2013.01); *B60N 2/0276* (2013.01); *B60N 2/14* (2013.01); *B60N 2/4221* (2013.01); *B60N 2/995* (2018.02); *B60R 21/045* (2013.01); *B60R 21/055* (2013.01); *B60N 2/0232* (2013.01); *B60N 2002/0272* (2013.01);
(Continued)

(58) Field of Classification Search
CPC ............. B60R 21/0286; B60R 21/045; B60R 2021/0051; B60N 2/0276; B60N 2002/0272
See application file for complete search history.

(56) References Cited

U.S. PATENT DOCUMENTS 4,951,963 A * 8/1990 Behr ................. B60R 21/02
280/752
2004/0046377 A1* 3/2004 Meduvsky ............ B60R 21/02
280/752
(Continued)

FOREIGN PATENT DOCUMENTS

KR 20020047683 A * 6/2002

OTHER PUBLICATIONS

Jang Myeong Gi, Device for Adjusting Bolster of Seat Back for Vehicle, Jun. 22, 2002, EPO, KR 2002-0047683 A, English Abstract (Year: 2002).*

(Continued)

*Primary Examiner* — James A English
(74) *Attorney, Agent, or Firm* — Morgan, Lewis & Bockius LLP

(57) ABSTRACT

An apparatus for controlling a crash pad may include a hinge disposed at a lower portion of a knee bolster of the crash pad; a first guide rail configured to drive the hinge; a second guide rail configured to drive the hinge; a first gear configured to drive the first guide rail; a first actuator configured to drive the first gear in response to a signal to operate a vehicle seat; and a second actuator configured to drive the second gear in response to a seat operation signal for the vehicle.

7 Claims, 10 Drawing Sheets

(51) Int. Cl.
*B60N 2/02* (2006.01)
*B60N 2/14* (2006.01)
*B60R 21/055* (2006.01)
*B60R 21/045* (2006.01)
*B60N 2/42* (2006.01)
*B60R 21/206* (2011.01)
*B60R 21/00* (2006.01)

(52) U.S. Cl.
CPC ..... *B60R 21/206* (2013.01); *B60R 2021/0044* (2013.01); *B60R 2021/0048* (2013.01); *B60R 2021/0051* (2013.01); *B60R 2021/0273* (2013.01)

(56) References Cited

U.S. PATENT DOCUMENTS

| | | | | |
|---|---|---|---|---|
| 2004/0094943 | A1* | 5/2004 | Fukawatase | B60R 21/02 280/753 |
| 2005/0110250 | A1* | 5/2005 | Funakura | B60R 21/045 280/730.1 |
| 2006/0113782 | A1* | 6/2006 | Pal | B60R 21/045 280/753 |
| 2006/0290123 | A1* | 12/2006 | Motozawa | B60R 21/045 280/752 |
| 2007/0102908 | A1* | 5/2007 | Schuler | B60R 21/013 280/732 |
| 2007/0185635 | A1* | 8/2007 | Mattes | B60N 2/0224 701/45 |
| 2013/0241185 | A1* | 9/2013 | Tanaka | B60R 21/045 280/751 |
| 2014/0125043 | A1* | 5/2014 | Takai | B60R 21/045 280/748 |
| 2017/0210248 | A1* | 7/2017 | Rao | B60R 21/01554 |

OTHER PUBLICATIONS

Jang Myeong Gi, Device for Adjusting Bolster of Seat Back for Vehicle, Jun. 22, 2002, EPO, KR 2002-0047683 A, Machine Translation of Description (Year: 2002).*

Narukawa, T. and Nishimura, H, "Control System Design for Occupant Lower Extremity Protection in Vehicle Frontal Collision (Cooperative Control of Active Knee Bolster and Active Lap Belt)," *Journal of System Design and Dynamics*, vol. 5:2011, pp. 1176-1187 (2011).

* cited by examiner

APPARATUS FOR CONTROLLING CRASH PAD LINKED WITH VEHICLE SEAT AND METHOD FOR CONTROLLING CRASH PAD FOR VEHICLE

CROSS-REFERENCE(S) TO RELATED APPLICATIONS

The present application claims priority to Korean Patent Application No. 10-2016-0169319 filed on Dec. 13, 2016, the entire contents of which are incorporated herein for all purposes by this reference.

BACKGROUND OF THE INVENTION

Field of the Invention

The present invention relates to a method for controlling a crash pad for a vehicle. More particularly, the present invention relates to an apparatus for controlling a crash pad linked with a vehicle seat, and a method for controlling a crash pad for a vehicle.

Description of Related Art

In recent years, buyers of vehicles have a growing interest in purchasing expensive vehicles with convenient apparatuses and ensured safety. Further, as vehicle culture has shifted, a change in recognition by using a vehicle as a multiple purpose space instead of a simple transportation method has accelerated the high quality trend of the vehicle market. According to the above social phenomenon, a high quality vehicle market starts so that a passenger air bag, a lateral backseat air bag, and knee air bag for protecting knees of a driver as well as an existing driver seat front air bag have been developed and applied.

Various air bag technologies are applied according to the protection part of an occupant. However, when a frontal crash occurs in a state that the driver wears a seat belt and an air bag is mounted, the driver's legs are most often injured. Accordingly, a knee air bag is mounted at an instrument panel at an inner side of a knee in the driver seat or a passenger seat. When the frontal crash occurs, the knee air bag deploys simultaneously with a frontal crash air bag to protect the knees and reduce the load applied to the femur. The knee air bag reduces the risk and degree of injury to the chest and head by improving the action of the occupant while initially limiting the knee, and prevents the submarine phenomenon where the pelvis slips under the seat belt. Further, when an offset crash occurs, the knee air bag may prevent knees injury from a collision with the steering column.

In general, when a crash occurs in the vehicle, passengers in the vehicle are pulled toward a front crash pad due to inertial force. For the present reason, an air bag and a body belt are mounted in the vehicle as an apparatus for protecting passengers. Although a upper part of a stomach of the passenger is protected by an air bag and a body belt, an engine compartment is pulled so that a caul cross bar located at an inner bottom side of the crash pad and a lower panel configuring a lower portion of the crash pad may strike knees of the passenger.

As a solution with respect thereto, a knee bolster is mounted in an inner bottom side of the crash pad (dashboard) to reduce an injured value of knees of the passenger.

The information disclosed in this Background of the Invention section is only for enhancement of understanding of the background of the invention and should not be taken as an acknowledgment or any form of suggestion that this information forms the prior art already known to a person skilled in the art.

BRIEF SUMMARY

Various aspects of the present invention are directed to providing an apparatus for controlling a crash pad linked with a vehicle seat, and a method for controlling a crash pad for a vehicle having the advantages of reducing the risk of injury of an occupant by controlling a crash pad linked with a vehicle seat when a vehicle collides.

An exemplary embodiment of the present invention are directed to providing an apparatus for controlling a crash pad, the apparatus including a hinge disposed at a lower portion of a knee bolster of the crash pad; a first guide rail configured to drive the hinge; a second guide rail configured to drive the hinge; a first gear configured to drive the first guide rail; a first actuator configured to drive the first gear in response to a signal to operate a vehicle seat; and a second actuator configured to drive the second gear in response to a seat operation signal for the vehicle.

The seat operation signal may rotate the vehicle seat or change the position of a leg rest of the vehicle seat.

When the position of a leg rest included in the vehicle seat is changed, the first actuator and the second actuator may be operated with the same stroke.

When the seat for the vehicle is rotated, the first actuator and the second actuator may be operated with different strokes.

When the seat for the vehicle is rotated by an angle greater than a reference angle, an air bag that is disposed at the crash pad disposed forward of an occupant seat of the vehicle and protects a head or chest of an occupant may not be operated and the first actuator and the second actuator stop.

The apparatus for controlling a crash pad may be disposed forward of an occupant seat or a driver seat.

Another exemplary embodiment of the present invention are directed to providing a method for controlling a crash pad, the method including: controlling a seat for the vehicle to be operated by a controller; and controlling an angle of a knee bolster of the crash pad based on an operations state of the seat for the vehicle by the controller.

Controlling of the seat for the vehicle to be operated may include operating a leg rest included in the vehicle seat by the controller, wherein the controller may control the angle of the knee bolster of the crash pad by controlling an actuator based on an operation state of the leg rest.

Controlling of the vehicle seat to be operated may include rotating the seat for the vehicle by the controller, wherein the controller may control a first actuator and a second actuator for controlling the angle of the knee bolster with different strokes based on a rotations state of the vehicle seat.

Since the apparatus for controlling a crash pad for a vehicle and the method for controlling a crash pad for the vehicle according to an exemplary embodiment of the present invention may change an angle of a lower portion (or lower cover) of a crash pad according to a seating state of various occupants, injury to the occupants may be reduced upon collision of the vehicle.

Further, although the seating state of the occupant is changed, an exemplary embodiment of the present invention may maintain a space for the knees of the occupant.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
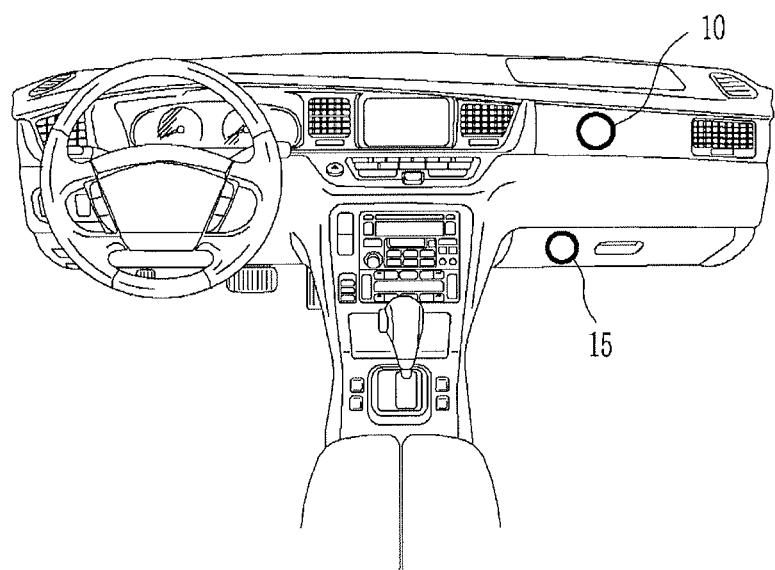
FIG. 1 is a view illustrating a safety apparatus in a vehicle for protecting occupants when a vehicle collides.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

The terms used in the specification are for explaining specific embodiments and have no intention to limit the invention. Unless the context indicates otherwise, the singular expression may include the plural expression. In the following description, the term "include" or "has" will be used to refer to the feature, the number, the step, the operation, the component, the part or the combination thereof without excluding the presence or addition of one or more features, the numbers, the steps, the operations, the components, the parts or the combinations thereof.

Throughout this specification and the claims that follow, when it is described that an element is "coupled" to another element, the element may be "directly coupled" to the other element or "electronically coupled" to the other element through a third element.

Unless defined otherwise, the terms including technical and scientific terms used in the present specification may have the meaning that can be commonly apprehended by those skilled in the art. The terms, such as the terms defined in the commonly-used dictionary, must be interpreted based on the context of the related technology and must not be interpreted ideally or excessively.

FIG. 1 is a view illustrating a safety apparatus in a vehicle for protecting occupants when a vehicle collides.

Referring to FIG. 1, reference numeral 10 may indicate an air bag for protecting the head or chest of an occupant and mounted at a crash pad. Reference numeral 15 may indicate a knee air bag of a crash pad or a knee bolster of the crash pad for protecting the knees of an occupant.

Figure 2:
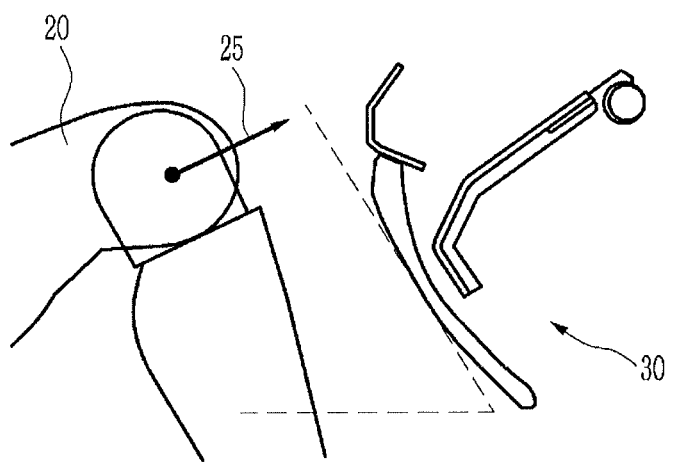
FIG. 2 is a side view illustrating a knee bolster for a vehicle shown in FIG. 1.

FIG. 2 is a side view illustrating a knee bolster for a vehicle shown in FIG. 1.

Referring to FIG. 2, a lower portion 30 of a crash pad (or knee bolster for a vehicle) provides a space 25 for knees so that the knees of the occupant 20 may freely move. When the vehicle collides, the lower portion 30 of a crash pad prevents the knees of the occupant from injury. The lower portion 30 of a crash pad has a fixed structure.

Figure 3:
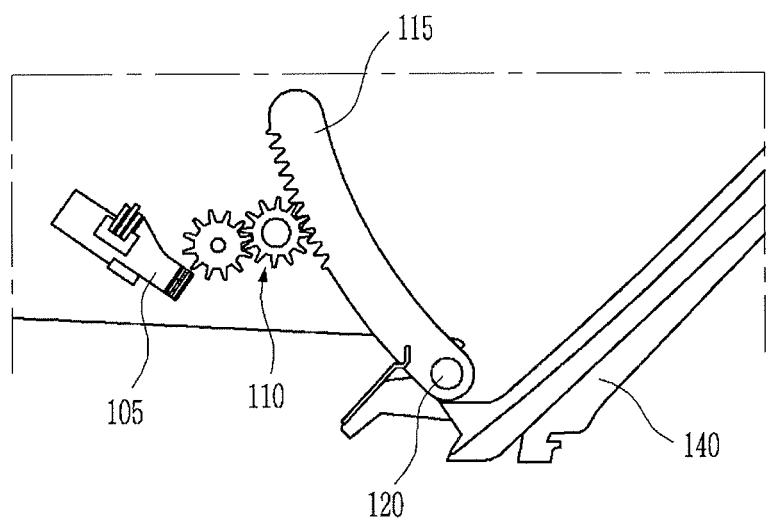
FIG. 3 is a side view illustrating an apparatus for controlling a crash pad for a vehicle according to an exemplary embodiment of the present invention.
Figure 4:
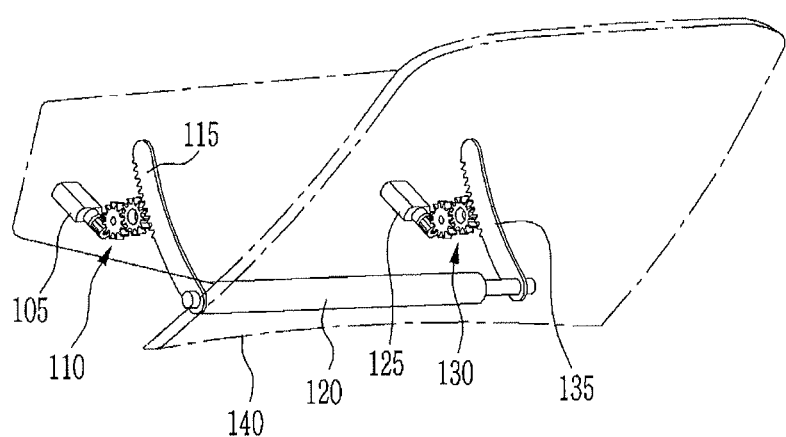
FIG. 4 is a perspective view illustrating an apparatus for controlling a crash pad for a vehicle according to an exemplary embodiment of the present invention.

FIG. 3 is a side view illustrating an apparatus for controlling a crash pad for a vehicle according to an exemplary embodiment of the present invention. FIG. 4 is a perspective view illustrating an apparatus for controlling a crash pad for a vehicle according to an exemplary embodiment of the present invention.

Referring to FIG. 3 and FIG. 4, when the position of a leg rest of a vehicle seat is changed or the vehicle seat is rotated, the apparatus for controlling a crash pad for a vehicle (or system for controlling a crash pad for a vehicle) may change an angle of a lower portion of a crash pad (or knee bolster) forward, backward, leftward, and rightward in response to a signal from a controller (e.g., Electronic Control Unit (ECU)) for controlling a vehicle seat. The apparatus for controlling a crash pad for a vehicle may be disposed forward of a passenger seat or a driver seat in the vehicle.

The apparatus for controlling a crash pad for a vehicle may include a hinge 120 disposed at a lower portion of a cover (or knee bolster) of a glove box, a first guide rail 115 and a second guide rail 135 configured to drive the hinge 120, a first gear (or first gear assembly) 110 configured to the first guide rail 115, a first actuator (or first actuator assembly) 105 configured to drive the first gear 110, and a second actuator 125 configured to drive the second gear 130.

The first actuator 105 may drive the first gear 110 in response to a signal to operate the vehicle seat. The second actuator 125 may drive the second gear 130 in response to a signal to operate the vehicle seat. The first actuator 105 or the second actuator 125 may include an electric motor.

The vehicle seat operation signal may rotate the vehicle seat or change a position of a leg rest of the vehicle seat.

Figure 5:
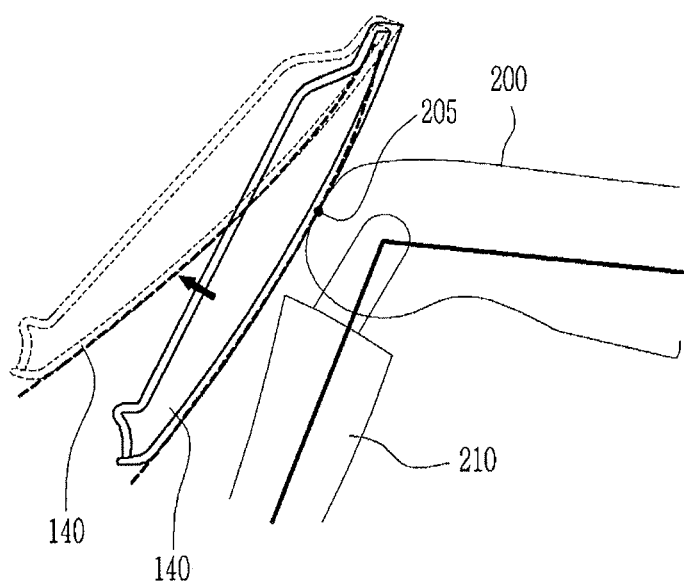
FIG. 5 is a side view illustrating an operation example of the apparatus for controlling a crash pad for a vehicle shown in FIG. 4.
Figure 6:
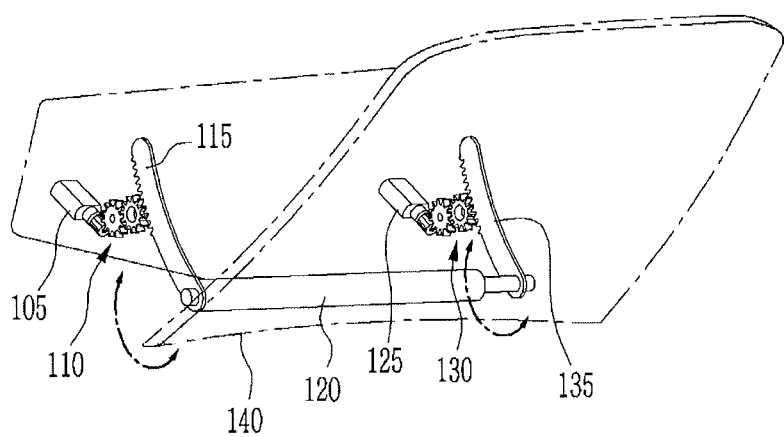
FIG. 6 is a view corresponding to an operation example of the apparatus for controlling a crash pad for a vehicle shown in FIG. 5.
Figure 7:
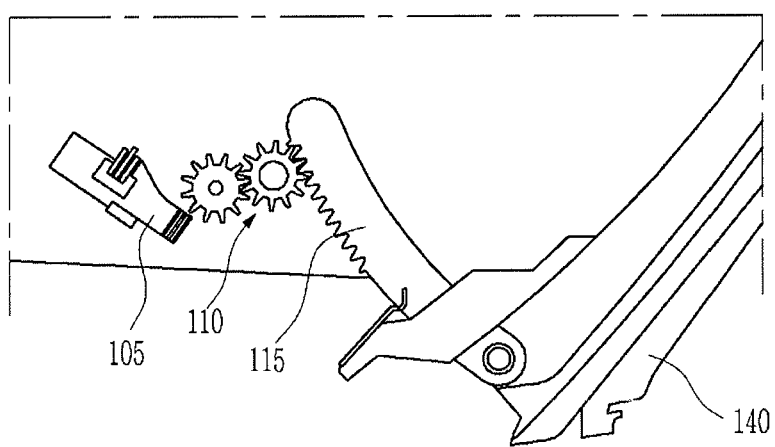
FIG. 7 is a view illustrating a state before the apparatus for controlling a crash pad for a vehicle shown in FIG. 6 is operated.
Figure 8:
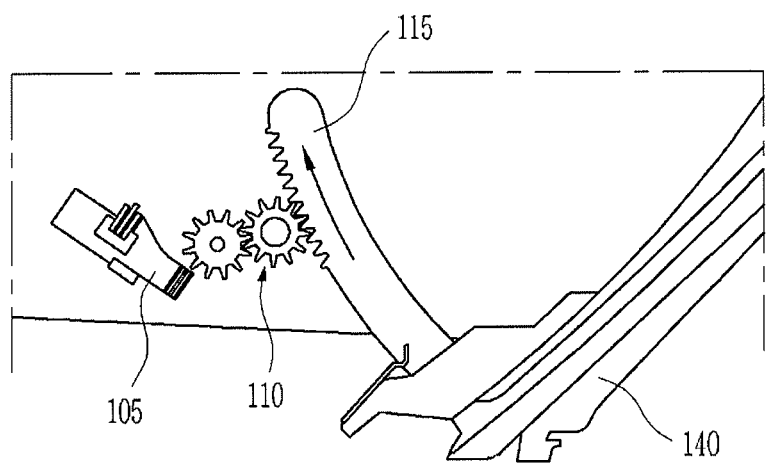
FIG. 8 is a view illustrating a state when the apparatus for controlling a crash pad for a vehicle shown in FIG. 6 is operated.

FIG. 5 is a side view illustrating an operation example of the apparatus for controlling a crash pad for a vehicle shown in FIG. 4. FIG. 6 is a view corresponding to an operation example of the apparatus for controlling a crash pad for a vehicle shown in FIG. 5. FIG. 7 is a view illustrating a state before the apparatus for controlling a crash pad for a vehicle shown in FIG. 6 is operated. FIG. 8 is a view illustrating a state when the apparatus for controlling a crash pad for a vehicle shown in FIG. 6 is operated.

Referring to FIG. 5, FIG. 6, FIG. 7, and FIG. 8, without rotation of the vehicle seat, a leg rest disposed above a leg 210 of the occupant 200 is operated according to a signal (e.g., a leg rest operation switch signal or the vehicle seat operation signal by the occupant) from the controller, the first actuator 105 and the second actuator 125 may be simultaneously with the same stroke. The first actuator 105 and the second actuator 125 may drive the first gear 110 and the second gear 130, and the first guide rail 115 and the second guide rail 135 may be driven by the first gear 110 and the second gear 130. The driven first guide rail 115 and the driven second guide rail 135 may push or pull the hinge 120 connected to the lower portion of the crash pad (or knee bolster) 140. As a result, the knee bolster 140 is rotated based on a rotation shaft disposed at an upper portion of the knee bolster 140 so that an angle (or rotation angle) of the knee bolster may be changed.

The stroke may mean a distance where an actuator moves the first guide rail 115 and the second guide rail 135. Reference numeral 205 of FIG. 5 may indicate the knees of the occupant 200 making contact with the knee bolster when the vehicle collides without using the leg rest. There should not be a sharp edge in a portion of the knee bolster 140 making contact with the knees of the occupant 200.

Accordingly, an exemplary embodiment of the present invention may prevent the occupant 200 from getting injured due to an insufficient distance between the shin of the occupant and a bottom end portion of a cover 140 of a glove box and a sharp edge portion of a cover (or knee bolster) 140 of a glove box. In other words, the knees of the occupant 200 may be protected by moving the knee bolster 140 forwards and backwards thereof.

Figure 9:
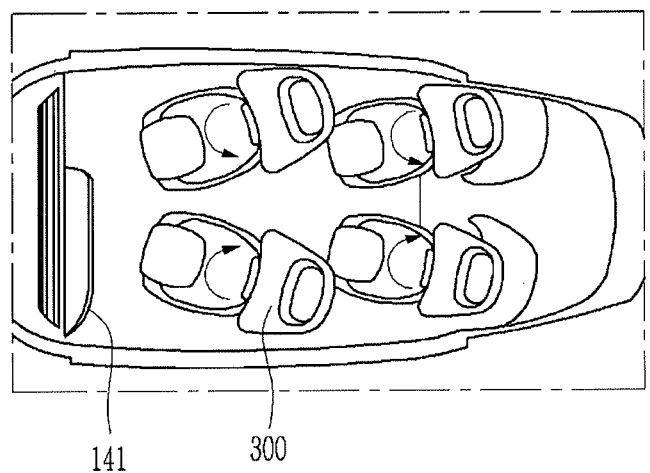
FIG. 9 is a plan view illustrating another operation example of the apparatus for controlling a crash pad for a vehicle shown in FIG. 4.
Figure 10:
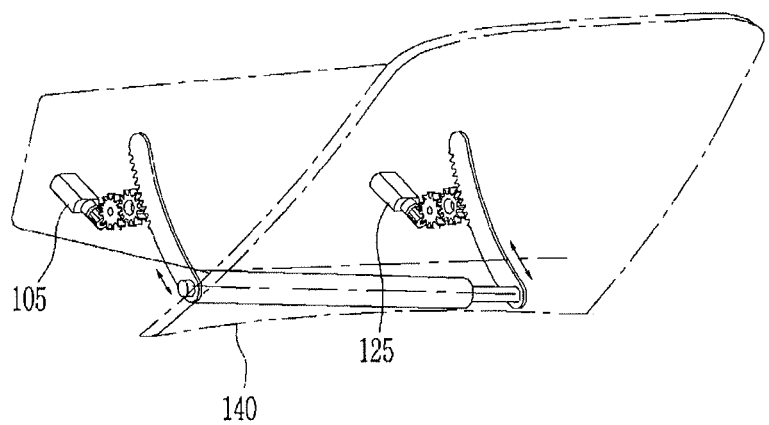
FIG. 10 is a plan view illustrating an operation example of the apparatus for controlling a crash pad for a vehicle shown in FIG. 9.

FIG. 9 is a plan view illustrating another operation example of the apparatus for controlling a crash pad for a vehicle shown in FIG. 4. FIG. 10 is a plan view illustrating an operation example of the apparatus for controlling a crash pad for a vehicle shown in FIG. 9.

Referring to FIG. 9 and FIG. 10, when the vehicle seat 300 is operated (rotated) at an angle of 0 to 45 degrees based on a front direction of the vehicle including the apparatus for controlling a crash pad for the vehicle according to the vehicle seat operation signal from the controller, the first actuator 105 and the second actuator 125 may be actuated with different strokes. Accordingly, a space between a lower portion of the crash pad 141 and the rotated vehicle seat may be maintained continuously.

When the vehicle seat 300 is rotated at an angle greater than a reference angle (e.g., 45 degrees), an air bag (e.g., air bag indicated by reference numeral 10 shown in FIG. 1) disposed at a crash pad 141 disposed forward of an occupant seat of the vehicle to protect a head or chest of the occupant is not operated, the first actuator 105 and the second actuator 125 for driving (moving) the lower portion of a crash pad (instrument panel pad or dash board) 141 may stop. The operation of the air bag may be controlled by the controller.

A method for controlling a crash pad according to an exemplary embodiment of the present invention will be described as follows.

Referring to FIG. 3 to FIG. 10, at a first control step, the controller may control the vehicle seat 300 to be operated. For example, the controller may be at least one microprocessor or hardware including the microprocessor. The program may include a series of instructions for performing the method for controlling a crash pad for the vehicle according to an exemplary embodiment of the present invention.

In the second control step, the controller may control an angle of knee bolster 140 of a crash pad 141 based on an operation state of the vehicle seat 300.

In another exemplary embodiment of the present invention, the controller may operate a leg rest included in the vehicle seat 300, and then control an angle of the knee bolster 140 of a crash pad 141 by controlling an actuator 105 or 125 based on the operation state of the leg rest. For example, the controller may control the first actuator 105 and the second actuator 125 for controlling an angle of the knee bolster to be operated with the same stroke based on the operation state of the leg rest (e.g., a state where the leg rest is operated forward or backward of the vehicle. Accordingly, a distance between the knee bolster and knees of the occupant may be maintained continuously.

In another exemplary embodiment of the present invention, the controller may rotate the vehicle seat 300. The controller may control the first actuator 105 and the second actuator 125 for controlling an angle of the knee bolster 140 to be operated with different strokes based on a rotation state of the vehicle seat. Accordingly, a distance between the knee bolster and knees of the occupant may be maintained continuously.

As described above, an exemplary embodiment of the present invention may change an angle of a lower portion of the crash pad corresponding to a knees space of the occupant according to an operation state of the vehicle seat. When a leg rest for the vehicle seat is used, an exemplary embodiment of the present invention may change an angle of the lower portion of the crash pad by an operation of an actuator in response to a leg rest operation switch signal (or the vehicle seat operation signal) by the occupant. When rotation angle of the vehicle seat is changed, actuators disposed at both sides of the lower portion of the crash pad are operated with different strokes according to the rotation (or position) of the vehicle seat, so that a distance between the lower portion of the crash pad and the knees of the occupant may be maintained continuously.

As used in the present embodiment, the term "form elements", "~unit", "block", or "~module" may be configured by software including a task, a class, a sub-routine, a process, an object, an execution thread, and a program performed in a predetermined area in a memory or hardware including a field programmable gate array (FPGA) or an application-specific integrated circuit (ASIC), or the combination thereof. The constituent elements or "~unit" may be included in a computer readable storage medium, and may be partially distributed in a plurality of computers.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling a crash pad, the apparatus comprising:
 a hinge disposed at a lower portion of a knee bolster of the crash pad;
 a first guide rail configured to drive the hinge;
 a second guide rail configured to drive the hinge;
 a first gear configured to drive the first guide rail;
 a second gear configured to drive the second guide rail;
 a first actuator configured to drive the first gear in response to a signal to operate a vehicle seat; and
 a second actuator configured to drive the second gear in response to a seat operation signal for a vehicle,
 wherein the first actuator and the second actuator are operated with a same stroke or with different strokes in response to the seat operation signal,
 wherein the seat operation signal for the vehicle rotates the vehicle seat, and
 wherein when the vehicle seat is rotated, the first actuator and the second actuator are operated with the different strokes.

2. The apparatus for controlling the crash pad of claim 1, wherein the seat operation signal for the vehicle changes a position of a leg rest of the vehicle seat.

3. The apparatus for controlling the crash pad of claim 2, wherein when the position of the leg rest included in the vehicle seat is changed, the first actuator and the second actuator are operated with the same stroke.

4. The apparatus for controlling the crash pad of claim 2, wherein when the vehicle seat is rotated by an angle greater than a reference angle, an air bag that is disposed at the crash pad disposed forward of an occupant seat of the vehicle and protects a head or chest of an occupant is not operated and the first actuator and the second actuator stop.

5. The apparatus for controlling the crash pad of claim 1, wherein the apparatus for controlling the crash pad is disposed forward of a passenger seat or a driver seat.

6. A method for controlling a crash pad, the method including:
 controlling a vehicle seat to be operated by a controller; and
 controlling an angle of a knee bolster of the crash pad based on an operation state of the vehicle seat by the controller,
 wherein the controller controls a first actuator and a second actuator for controlling the angle of the knee bolster with different strokes or with a same stroke based on the operation state of the vehicle seat,
 wherein the controlling of the vehicle seat to be operated includes rotating the vehicle seat by the controller, and
 wherein the controller controls the first actuator and the second actuator for controlling the angle of knee bolster with the different strokes based on a rotation state of the vehicle seat.

7. The method for controlling the crash pad of claim 6, wherein the controlling of the vehicle seat to be operated including:
 operating a leg rest included in the vehicle seat by the controller,
 wherein the controller controls the angle of the knee bolster of the crash pad by controlling one of the first and second actuators based on an operation state of the leg rest.

* * * * *